United States Patent
Yoo et al.

(10) Patent No.: US 10,173,593 B2
(45) Date of Patent: Jan. 8, 2019

(54) LANE DISPLAY DEVICE USING OUTSIDE MIRROR AND METHOD THEREOF

(71) Applicant: HYUNDAI MOTOR COMPANY, Seoul (KR)

(72) Inventors: Kyung Ho Yoo, Seoul (KR); Jin Hyuk Choi, Miryang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/366,365

(22) Filed: Dec. 1, 2016

(65) Prior Publication Data

US 2018/0099613 A1    Apr. 12, 2018

(30) Foreign Application Priority Data

Oct. 6, 2016   (KR) ................. 10-2016-0129278

(51) Int. Cl.
| | | |
|---|---|---|
| *B60R 1/08* | (2006.01) | |
| *G08G 1/16* | (2006.01) | |
| *B60R 1/12* | (2006.01) | |
| *B60R 1/02* | (2006.01) | |

(52) U.S. Cl.
CPC ................ *B60R 1/08* (2013.01); *B60R 1/025* (2013.01); *B60R 1/12* (2013.01); *G08G 1/167* (2013.01); *B60R 2001/1253* (2013.01); *B60R 2300/804* (2013.01)

(58) Field of Classification Search
CPC .. B60R 1/08; B60R 1/12; B60R 1/025; B60R 230/804; B60R 2001/1253; G08G 1/167
See application file for complete search history.

(56) References Cited

U.S. PATENT DOCUMENTS

| | | | | |
|---|---|---|---|---|
| 7,400,235 | B2 * | 7/2008 | Kawazoe | ................. B60Q 1/24 296/1.11 |
| 2007/0290823 | A1 | 12/2007 | Watanabe et al. | |
| 2008/0106389 | A1 * | 5/2008 | Desai | ................... B60Q 1/2665 340/425.5 |
| 2009/0021609 | A1 * | 1/2009 | Luo | ........................ B60Q 9/005 348/241 |

(Continued)

FOREIGN PATENT DOCUMENTS

| | | |
|---|---|---|
| JP | 2008-97279 A | 4/2008 |
| JP | 2008-222153 A | 9/2008 |

(Continued)

OTHER PUBLICATIONS

Machine Translation of JP 2009-116723 retrieved from espacenet on Jul. 10, 2018 (Year: 2018).*

(Continued)

*Primary Examiner* — Thomas Ingram
(74) *Attorney, Agent, or Firm* — Knobbe Martens Olson & Bear LLP

(57) ABSTRACT

A lane display device using an outside mirror is disclosed. The lane display device includes a lane detection unit detecting a lane from a side view image of a vehicle; a control unit determining a position of the lane on an outside mirror corresponding to a position of the lane detected by the lane detection unit, and controlling the outside mirror to display the lane in the determined position; and the outside mirror including a display unit and a half mirror and displaying the lane.

6 Claims, 6 Drawing Sheets

(56) References Cited

U.S. PATENT DOCUMENTS

2015/0042803 A1    2/2015  Heinemann et al.
2015/0314732 A1  11/2015  Lynam
2016/0355136 A1* 12/2016  Kuo ......................... B60R 1/06
2017/0054946 A1*  2/2017  Lee ......................... B60R 1/00
2017/0166130 A1*  6/2017  Foote ....................... B60R 1/00

FOREIGN PATENT DOCUMENTS

| | | |
|---|---|---|
| JP | 2009-116723 A | 5/2009 |
| JP | 2013-75612 A | 4/2013 |
| JP | 2013-168063 A | 8/2013 |
| KR | 10-2013-0095967 A | 8/2013 |

OTHER PUBLICATIONS

Office Action in corresponding Korean Patent Application No. 10-2016-0129278—4 pages, (dated Jan. 20, 2018).

\* cited by examiner

LANE DISPLAY DEVICE USING OUTSIDE MIRROR AND METHOD THEREOF

CROSS-REFERENCE TO RELATED APPLICATION

This application is based on and claims the benefit of priority to Korean Patent Application No. 10-2016-0129278, filed on Oct. 6, 2016, in the Korean Intellectual Property Office, the disclosure of which is incorporated herein in its entirety by reference.

TECHNICAL FIELD

The present disclosure relates to a lane display device using an outside mirror and a method thereof.

BACKGROUND

In general, a vehicle has outside mirrors mounted on both sides of a front panel thereof for the purposes of helping the driver see areas behind and to the left/right sides of the vehicle while driving.

Such outside mirrors may be disposed toward the rear of the vehicle such that the mirrors reflect the rear of the vehicle.

In recent years, outside mirrors that can display information informing the presence of obstacles around the vehicle while interlocking with a side obstacle warning system (SOWS), a blind spot detection (BSD) system, and the like, have been developed. Such outside mirrors may be provided with LEDs for displaying the information.

A LED-type outside mirror merely informs the presence or absence of obstacles through a simple operation of LED ON/OFF, but does not display information that assists the driver in maintaining a lane while driving on a rainy day or at night.

The disclosure of this section is to provide background of the invention. Applicant notes that this section may contain information available before this application. However, by providing this section, Applicant does not admit that any information contained in this section constitutes prior art.

SUMMARY

The present disclosure has been made to solve the above-mentioned problems.

An aspect of the present disclosure provides a lane display device using a half-mirror type outside mirror and a method thereof, characterized by detecting a lane from a side view image of a vehicle and displaying the lane in a position on the outside mirror corresponding to a position of the detected lane, thereby allowing the driver to maintain the current lane while driving on a rainy day or at night.

Features of the present disclosure are not limited to the foregoing, and any other features and advantages not mentioned herein will be clearly understood from the following description. The present inventive concept will be more clearly understood from embodiments of the present disclosure. In addition, it will be apparent that the advantages of the present disclosure can be achieved by elements and features claimed in the claims and a combination thereof.

According to an aspect of the present disclosure, a lane display device using an outside mirror includes: a lane detection unit detecting a lane from a side view image of a vehicle; a control unit determining a position of the lane on an outside mirror corresponding to a position of the lane detected by the lane detection unit, and controlling the outside mirror to display the lane in the determined position; and the outside mirror including a display unit and a half mirror and displaying the lane.

According to another aspect of the present disclosure, a lane display method using an outside mirror includes: detecting, by a lane detection unit, a lane from a side view image of a vehicle; determining, by a control unit, a position of the lane on an outside mirror corresponding to a position of the detected lane; and displaying, by the outside mirror including a display unit and a half mirror, the lane in the position determined by the control unit.

BRIEF DESCRIPTION OF THE DRAWINGS

The above and other features, and advantages of the present disclosure will be more apparent from the following detailed description taken in conjunction with the accompanying drawings.

DETAILED DESCRIPTION

The above and other features, and advantages of the present disclosure will be more clearly understood from the following detailed description taken in conjunction with the accompanying drawings so that those skilled in the art to which the present disclosure pertains can easily carry out technical ideas described herein. In addition, a detailed description of well-known techniques associated with the present disclosure will be ruled out in order not to unnecessarily obscure the gist of the present disclosure. Hereinafter, embodiments of the present disclosure will be described in detail with reference to the accompanying drawings.

An aspect of the present invention provides a system for displaying lane marks on a road on a side mirror of a vehicle. In embodiments, the side mirror includes a half-mirror (not an electronic display) and a display displaced behind the half-mirror. The display is configured to displaying lane marks (lane lines) on and through the half mirror. The display's display surface is facing the rear surface of the half mirror such that image displayed by the display can be viewed to the driver of the vehicle on and through the half mirror.

In embodiments, a camera installed on the vehicle captures images (video images) including lane marks on the road next to the vehicle. A computerized controller processes the captured images and displays an image representing the lane marks using the display such that the image can be aligned synchronously, in the driver's view of the side mirror, with the lane marks reflected on the half mirror. Location of the image representing the lane marks can be determined by the computerized controller based on location and orientation of the camera, location and orientation of the half mirror (side mirror), relative position of the driver seat, and movement of the vehicle.

Figure 1:
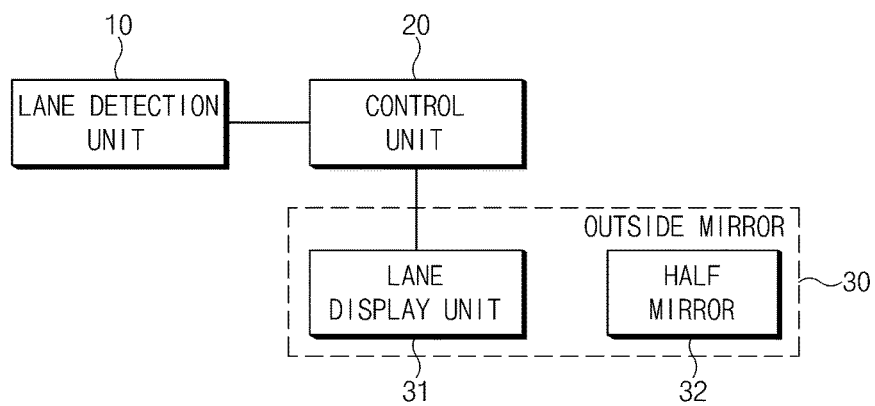
FIG. 1 illustrates a block diagram of the configuration of a lane display device using an outside mirror, according to an embodiment of the present disclosure.

FIG. 1 illustrates a block diagram of the configuration of a lane display device using an outside mirror, according to an embodiment of the present disclosure.

As illustrated in FIG. 1, the lane display device using an outside mirror, according to embodiments of the present disclosure, includes a lane detection unit 10, a controller unit 20, and an outside mirror 30.

With respect of each of the aforementioned elements, first, the lane detection unit 10 may detect a lane from an image obtained from a camera mounted on the side of a vehicle. Here, the lane detection unit 10 may include a right lane detector detecting a lane from an image obtained from a right camera mounted on the right side of the vehicle, and a left lane detector detecting a lane from an image obtained from a left camera mounted on the left side of the vehicle. The detected right lane may be displayed on a right outside mirror, and the detected left lane may be displayed on a left outside mirror.

Next, the control unit 20 generally controls the aforementioned respective elements to perform the functions thereof normally.

Figure 2:
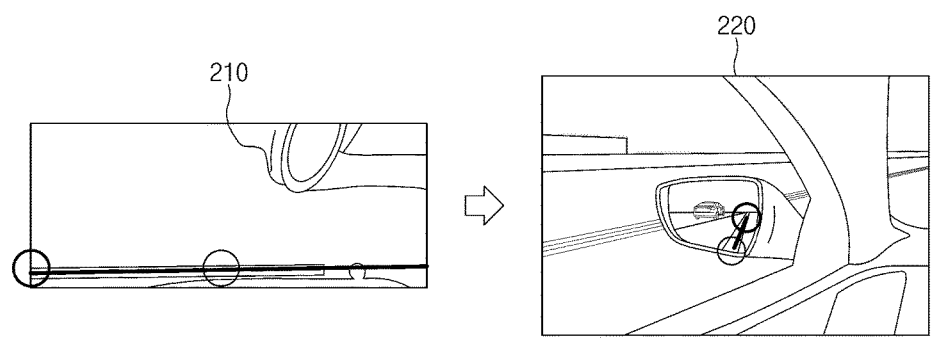
FIG. 2 illustrates the result of displaying a lane in a side-view image of a vehicle on an outside mirror of the vehicle, according to an embodiment of the present disclosure.

In particular, the control unit 20 may store an algorithm for matching the position of the lane detected by the lane detection unit 10 with the position of the lane reflected on the outside mirror. FIG. 2 illustrates a result 220 of displaying a lane in an image 210 on the outside mirror 30, based on the matching algorithm. Since the matching algorithm receives a position of a driver (for example, a position of a seat) as a parameter, it may provide the optimal matching performance irrespective of the position of the driver.

In addition, the control unit 20 may determine the position of the lane on the outside mirror 30 corresponding to the position of the lane detected by the lane detection unit 10 based on the matching algorithm, and control the outside mirror 30 to display the lane in the determined position.

Here, the outside mirror 30 includes a lane display unit 31 and a half mirror 32, and may have a structure in which the lane display unit 31 is covered with the half mirror 32. For reference, the half mirror 32 is a mirror that reflects part of light and transmits part of light, and the reflexibility and transmissibility thereof is generally half-and-half. In addition, the lane display unit 31 may be an LED/LCD type display unit.

In other words, the control unit 20 may determine the position of the lane on the lane display unit 31 corresponding to the position of the lane detected by the lane detection unit 10 based on the matching algorithm, and control the lane display unit 31 to display the lane in the determined position. By displaying the lane on the lane display unit 31, the driver may recognize the lane through the outside mirror 30 more clearly.

Meanwhile, the control unit 20 may perform the functions of the lane detection unit 10.

Figure 3:
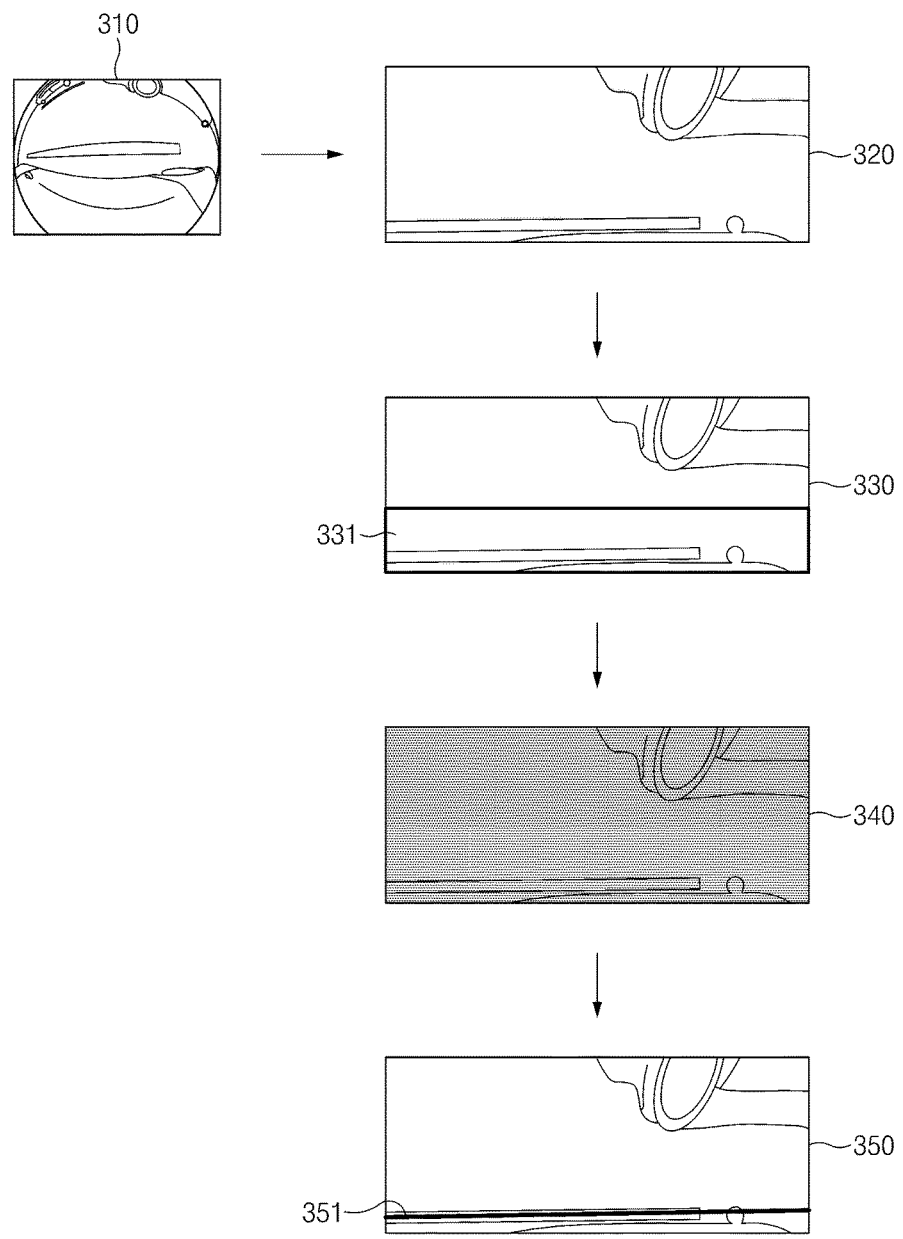
FIG. 3 illustrates a lane detection process, according to an embodiment of the present disclosure.

FIG. 3 illustrates a lane detection process of the lane detection unit 10, according to an embodiment of the present disclosure. The lane detection unit 10 includes a separate controller to perform the following process.

First of all, an image 310 including a lane may be input from the camera mounted on the side of the vehicle.

Next, in order to remove the effect of perspective from the input image 310, inverse perspective mapping (IPM) may be performed.

A general road image may be represented by a solid line or a dotted line in two dimension (2D), but a real road including lanes is three-dimensional (3D), and thus, it is required to remove the effect of perspective for lane detection or lane recognition. In other words, it may be difficult to accurately determine the lane and road parameters due to the effect of perspective, and thus, the IPM for mapping a 3D surface into a 2D surface using specific acquisition conditions such as camera position, coordinates, and optics may be performed in order to remove the effect of perspective.

Thereafter, a region of interest (ROI) 331 may be set in a flat 2D image 320. The flat 2D image in which the ROI has been set is indicated by "330".

Then, the ROI of the flat 2D image may be filtered to remove noise. Based on a threshold value through histogram analysis with respect to the filtered ROI, all values less than or equal to the threshold value may be set to 0 (zero). For example, in order to find a portion corresponding to a lane in the filtered ROI, the values of pixels excepting pixels of the portion estimated as the lane may be set to "0x00". Here, a reference value is required to distinguish the lane from the background, and such a reference value is referred to as a threshold value.

Thereafter, the lane may be detected from the ROI. The image in which the lane has been detected is indicated by "340".

Then, a virtual line may be drawn on the detected lane, which is indicated by "350", thereby determining the lane.

The determined lane 351 may be displayed on the outside mirror 30 by the control unit 20. The displayed lane is illustrated in FIGS. 4 and 5.

Figure 4:
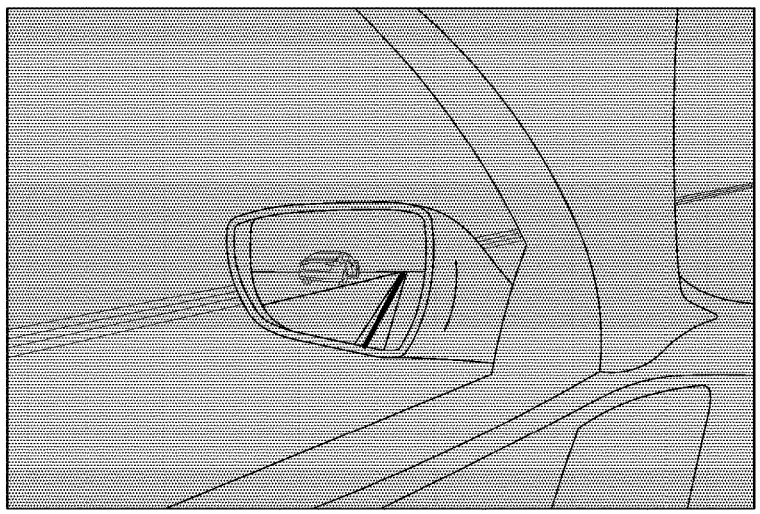
FIG. 4 illustrates a lane displayed on an outside mirror while driving at night, according to an embodiment of the present disclosure.
Figure 5:
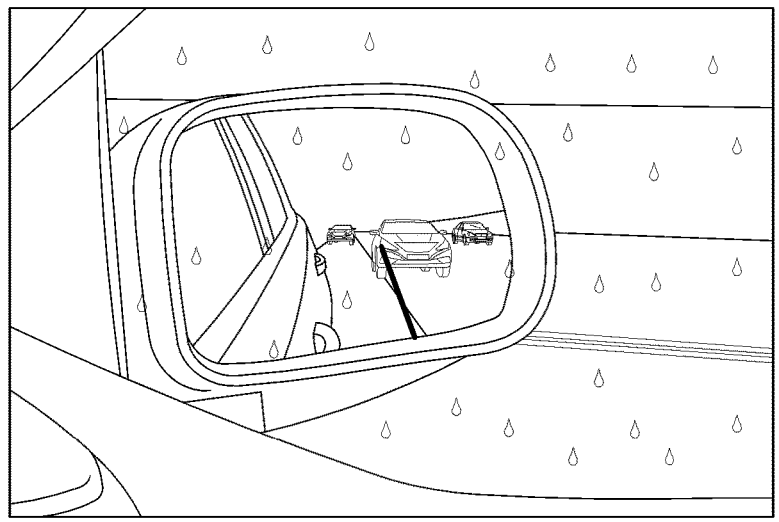
FIG. 5 illustrates a lane displayed on an outside mirror while driving on a rainy day, according to an embodiment of the present disclosure.

FIG. 4 illustrates the displaying of a lane while driving at night, and FIG. 5 illustrates the displaying of a lane while driving on a rainy day.

As can be seen in FIGS. 4 and 5, the driver is not easy to recognize the lane while driving at night or on a rainy day. However, when the present inventive concept is applied, the driver is able to clearly recognize the lane.

In embodiments, the lane detection unit 10 is independently provided to detect the lane from the image. Alternatively, the function of the lane detection unit 10 may be performed by the control unit 20.

In addition, the specific configuration of the lane display device applied to the vehicle will be described in more detail. The lane display device using outside mirrors includes a left outside mirror displaying a left lane, a right outside mirror displaying a right lane, a right lane detector detecting a lane from a right side view image of the vehicle, a left lane detector detecting a lane from a left side view image of the vehicle, and a control unit determining a position (hereinafter referred to as the "first position") of the lane on the right outside mirror corresponding to a position of the right lane detected by the right lane detector and determining a position (hereinafter referred to as the "second position") of the lane on the left outside mirror corresponding to a position of the left lane detected by the left lane detector. Here, the control unit may control the right outside mirror to display the lane in the first position, and control the left outside mirror to display the lane in the second position.

Figure 6:
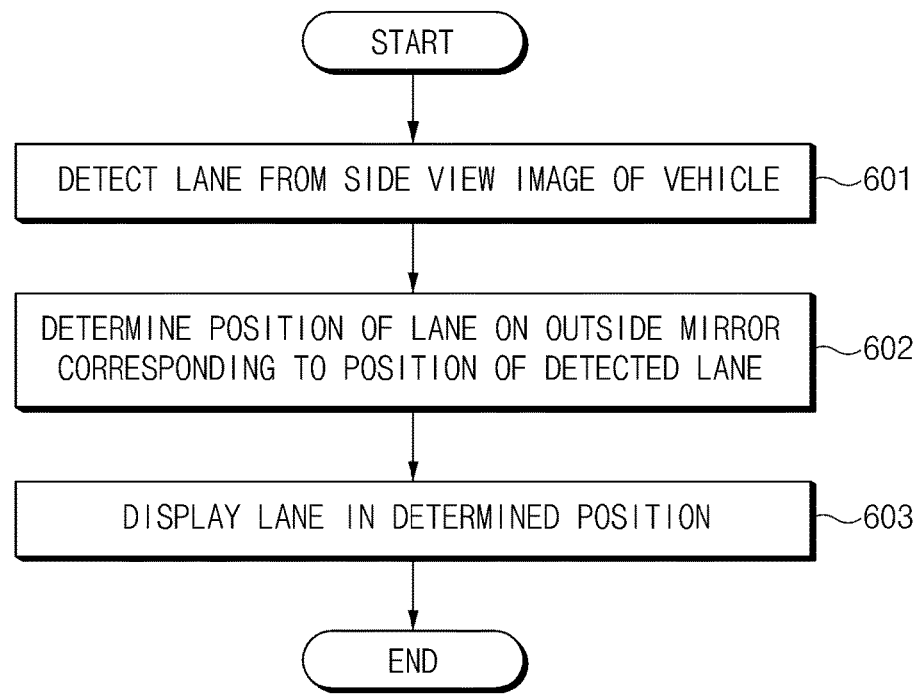
FIG. 6 illustrates a flowchart of a lane display method using an outside mirror, according to an embodiment of the present disclosure.

FIG. 6 illustrates a flowchart of a lane display method using an outside mirror, according to an embodiment of the present disclosure.

First of all, the lane detection unit 10 may detect a lane from a side-view image of a vehicle in 601. Here, the side-view image of the vehicle includes a right side view image obtained from a camera mounted on the right side of the vehicle and a left side view image obtained from a camera mounted on the left side of the vehicle.

Next, the control unit 20 may determine a position of the lane on the outside mirror 30 corresponding to a position of the lane detected by the lane detection unit 10 in 602. Here, the control unit 20 may perform the above function based on the matching algorithm.

Thereafter, the outside mirror 30 including the lane display unit 31 and the half mirror 32 may display the lane in the position determined by the control unit 20 in 603.

By allowing the driver to clearly recognize a current lane while driving on a rainy day or at night through the aforementioned procedures, the vehicle may be allowed to stay within the current lane while unintended lane departure may be prevented.

Meanwhile, the above-stated method according to embodiments of the present disclosure may be written as a computer program. Codes and code segments constituting the program may easily be inferred by a computer programmer skilled in the art. The written program may be stored in a computer-readable recording medium (an information storage medium) and be read and executed by a computer, thereby implementing the method according to embodiments of the present disclosure. The recording medium includes all types of computer-readable recording media.

As set forth above, the present inventive concept includes a half-mirror type outside mirror and is characterized by detecting a lane from a side view image of the vehicle and displaying the lane in a position on the outside mirror corresponding to a position of the detected lane, thereby allowing the driver to maintain the current lane while driving on a rainy day or at night. Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A lane display device using an outside mirror of a vehicle, the lane display device comprising:
    an outside mirror comprising a half mirror and a display placed behind the half mirror for displaying images through the half mirror;
    a lane detection unit configured for detecting a lane from a side view image captured by a camera mounted on the vehicle; and
    a control unit configured for determining a position of the lane reflected on a surface of the half mirror and further configured for controlling the display for displaying a lane mark such that the lane reflected on the surface of the half mirror coincides the lane mark displayed on the display from a driver's view,
    wherein the control unit stores an algorithm for matching the position of the lane detected by the lane detection unit with the position of the lane reflected on the outside mirror.

2. The lane display device according to claim 1, wherein the lane detection unit is configured to perform inverse perspective mapping (IPM) in order to remove an effect of perspective from the image.

3. The lane display device according to claim 1, wherein when the lane detection unit comprises:
    a right lane detector detecting a lane from a right side view image of the vehicle; and
    a left lane detector detecting a lane from a left side view image of the vehicle.

4. A lane display method using an outside mirror of a vehicle, the lane display method comprising:
    detecting, by a lane detection unit, a lane from a side view image captured by a camera mounted on the vehicle;
    determining, by a control unit, a position of the lane reflected on a half mirror of the outside mirror; and
    displaying, on a display placed behind the half mirror, a lane mark such that the lane reflected on the half mirror coincides the lane mark displayed on the display from a driver's view,
    wherein the control unit stores an algorithm for matching the position of the lane detected by the lane detection unit with the position of the lane reflected on the outside mirror.

5. The lane display method according to claim 4, wherein the detecting of the lane comprises performing inverse perspective mapping (IPM) in order to remove an effect of perspective from the side view image.

6. The lane display method according to claim 4, wherein the detecting of the lane comprises:
    detecting a lane from a right side view image of the vehicle; and
    detecting a lane from a left side view image of the vehicle.

* * * * *